US012616164B2

(12) United States Patent
Nakatani et al.

(10) Patent No.: US 12,616,164 B2
(45) Date of Patent: May 5, 2026

(54) PET TOILET SYSTEM

(71) Applicant: Unicharm Corporation, Ehime (JP)

(72) Inventors: Misato Nakatani, Kanonji (JP); Yasuhiro Sasano, Kanonji (JP); Shinya Kaneko, Kanonji (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 19/028,054

(22) Filed: Jan. 17, 2025

(65) Prior Publication Data

US 2025/0160294 A1 May 22, 2025

Related U.S. Application Data

(63) Continuation of application No. PCT/JP2023/025611, filed on Jul. 11, 2023.

(30) Foreign Application Priority Data

Jul. 20, 2022  (JP) ................................. 2022-115340

(51) Int. Cl.
A01K 1/01 (2006.01)

(52) U.S. Cl.
CPC .................................. A01K 1/0114 (2013.01)

(58) Field of Classification Search
CPC ... A01K 1/0114; A01K 1/0107; A01K 1/0152
(Continued)

(56) References Cited

U.S. PATENT DOCUMENTS 5,499,610 A * 3/1996 Bruner ................. A01K 1/0107
209/374
5,572,950 A * 11/1996 O'Rourke ............ A01K 1/0107
119/165
(Continued)

FOREIGN PATENT DOCUMENTS

JP          H03-061866 U     6/1991
JP          2019-103456 A    6/2019
(Continued)

OTHER PUBLICATIONS

International Preliminary Report on Patentability issued in corresponding International Application No. PCT/JP2023/025611, mailed Jan. 30, 2025 (10 pages).

*Primary Examiner* — Zoe Tam Tran
(74) *Attorney, Agent, or Firm* — Osha Bergman Watanabe & Burton LLP

(57) ABSTRACT
A pet toilet system includes an excretion container, having a liquid-permeable bottom surface portion, that accommodates toilet sand, a tray, disposed below the excretion container, that accommodates an absorption sheet that absorbs liquid permeated through the liquid-permeable bottom surface portion, a lower container that holds the tray, and an upper container disposed above the excretion container. The upper container has a front wall portion having an enter/exit portion through which a pet enters and exits, a pair of side wall portions, facing each other on both sides in a width direction of the enter/exit portion, extending in a front-rear direction of the upper container, and a rear wall portion facing the enter/exit portion in the front-rear direction. The upper container includes an opening region having an opening portion above the liquid-permeable bottom surface portion.

17 Claims, 11 Drawing Sheets

(58) Field of Classification Search
USPC ......................................... 119/167, 165, 166
See application file for complete search history.

(56) References Cited

U.S. PATENT DOCUMENTS

| | | | | |
|---|---|---|---|---|
| 5,975,017 | A | 11/1999 | Cameron | |
| 7,380,519 | B2 * | 6/2008 | Ikegami ............... | A01K 1/0107 |
| | | | | 119/167 |
| 9,565,830 | B1 | 2/2017 | Caico | |
| 2009/0000556 | A1 * | 1/2009 | Matsuo ............... | A01K 1/0107 |
| | | | | 119/161 |
| 2011/0297096 | A1 * | 12/2011 | Northrop ............ | A01K 1/0107 |
| | | | | 119/161 |
| 2013/0092092 | A1 * | 4/2013 | Matsuo ............... | A01K 1/0107 |
| | | | | 119/169 |
| 2015/0122189 | A1 | 5/2015 | Sweetman | |
| 2017/0347618 | A1 | 12/2017 | Spadola | |
| 2018/0220619 | A1 * | 8/2018 | Takagi ................ | A01K 1/0114 |
| 2021/0227781 | A1 * | 7/2021 | Penn-Awkard ...... | A01K 1/0114 |
| 2023/0255175 | A1 | 8/2023 | Yamamoto et al. | |
| 2024/0324544 | A1 * | 10/2024 | Peng ................... | A01K 1/0107 |

FOREIGN PATENT DOCUMENTS

| | | | |
|---|---|---|---|
| JP | 2020-022414 | A | 2/2020 |
| JP | 2022-067386 | A | 5/2022 |

* cited by examiner

PET TOILET SYSTEM

BACKGROUND

Technical Field

The present invention relates to a pet toilet system.

Discussion of the Background

As a pet toilet system, there is known a configuration including an excretion container that accommodates toilet sand covering or solidifying feces, a tray that is disposed below the excretion container and accommodates an absorption sheet that absorbs urine having passed through the toilet sand, a lower container that holds the tray, and an upper container disposed above the excretion container (see, for example, Patent Literature 1).

PATENT LITERATURE

Patent Literature 1: Japanese Patent Publication No. 2020-22414

Here, in a state where the toilet sand is wet with urine or a state where feces are wet, a room may be filled with offensive odor. In order to dry feces and urine, it is conceivable to improve air permeability inside the toilet. However, for example, in a case where a hole is simply made in the toilet, liquid such as urine or powder may be scattered outside the toilet, and the room may get smelly.

SUMMARY

One or more embodiments provide a pet toilet system that can suppress such smelliness from offensive odor by excrement.

A pet toilet system according to one or more embodiments includes: an excretion container configured to accommodate toilet sand and having a liquid-permeable bottom surface portion; a tray disposed below the excretion container and configured to accommodate an absorption sheet that absorbs liquid that has permeated through the bottom surface portion; a lower container configured to hold the tray; and an upper container disposed above the excretion container and having a front wall portion in which an enter/exit portion through which a pet enters and exits is formed, a pair of side wall portions provided so as to face each other on width-direction both sides of the enter/exit portion and extending in a front-rear direction, and a rear wall portion facing the enter/exit portion in the front-rear direction, and an opening region including one or a plurality of opening portions is formed in a region of the upper container above the bottom surface portion of the excretion container.

In the pet toilet system according to one or more embodiments, the opening region including one or a plurality of opening portions is formed in the region of the upper container above the bottom surface portion of the excretion container. According to such a configuration, air permeability above the bottom surface portion where feces and urine are held is improved. This makes it easy to dry feces and urine held on the bottom surface portion, and it is possible to suppress generation of offensive odor inside the toilet as compared with a state where toilet sand is wet with urine and a state where feces are wet. In addition, since the opening portion is formed in the region of the upper container above the bottom surface portion, for example, liquid such as urine that has permeated through the bottom surface portion and flowed downward, and cat sand chips and powder (powder or the like) to which cats and feces adhere are less likely to scatter from the opening portion to the outside of the toilet. As a result, it is possible to suppress the outside of the toilet from smelling bad. As described above, according to the pet toilet system according to one or more embodiments, it is possible to suppress a room from being filled with offensive odor by excrement.

The opening region may be formed with a slit-shaped opening portion. Although air passes through such a slit-shaped opening portion, liquid, powder, or the like hardly passes through the slit-shaped opening portion, so that it is possible to more appropriately suppress liquid such as urine, powder, or the like from scattering from the opening portion to the outside of the toilet.

The opening portion may have a width-direction length longer than a vertical length. By making the width-direction length of the opening portion sufficiently long, it is possible to improve air permeability in a wide range in the width direction on the bottom surface portion, and air can be efficiently moved. This makes it possible to further suppress generation of offensive odor inside the toilet. Furthermore, it is conceivable that the above-described liquid, powder, or the like is scattered in a height direction (vertical direction) when the pet scrapes the sand. In this regard, by making the length in the vertical direction shorter than that in the width direction, it is possible to suppress liquid, powder, or the like from coming out of the toilet from the opening portion due to the pet scraping the sand described above.

The opening portion may have a vertical length longer than a width-direction length. By making the vertical length of the opening portion sufficiently long, it is possible to improve air permeability in a wide range in the vertical direction, and air can be efficiently moved. For example, odor of urine is lighter than air and tends to stay in an upper portion of a space, while odor of feces is heavier than air and tends to stay in a lower portion of the space. In this regard, by improving air permeability in a wide range in the vertical direction, it is possible to efficiently excrete various offensive odors as described above. This makes it possible to further suppress generation of offensive odor inside the toilet.

The plurality of opening portions may be formed in the opening region at predetermined intervals in the vertical direction. As a result, it is possible to improve air permeability in a wide range in the vertical direction on the bottom surface portion, and air can be efficiently moved. This makes it possible to further suppress generation of offensive odor inside the toilet.

In a wall portion of the upper container in which the opening region is formed, a region of 5% or more of an entire region of the wall portion may be a region of the opening portion. As a result, the region of the opening portion is sufficiently secured to improve air permeability, and it is possible to appropriately suppress liquid, powder, or the like from scattering to the outside of the toilet due to an excessive increase in the region of the opening portion.

A vertical length of the opening region may be longer than a vertical length of the excretion container. In this way, by sufficiently securing the vertical length of the opening region, it is possible to improve air permeability in a wide range in the vertical direction on the bottom surface portion, and air can be efficiently moved. This makes it possible to further suppress generation of offensive odor inside the toilet.

A vertical length of one opening portion formed in the opening region may be shorter than the vertical length of the excretion container. As described above, since a depth of the excretion container is sufficiently secured, and the vertical length of the opening portion is set not to be too long, it is possible to appropriately suppress liquid, powder, or the like from scattering from the opening portion to the outside of the toilet.

The width-direction length of the opening portion may be longer than a width-direction length of the bottom surface portion. As a result, it is possible to improve air permeability in a wide range of an entire region in the width direction on the bottom surface portion, and air can be efficiently moved. This makes it possible to further suppress generation of offensive odor inside the toilet.

The width-direction length of the opening portion may be shorter than the width-direction length of the bottom surface portion. In such a configuration, a probability that liquid, powder, or the like reaches the opening portion, that is, a probability that liquid, powder, or the like leaks from the opening portion can be reduced.

The bottom surface portion may have a plurality of bottom surface openings which are opening parts through which liquid permeates, and a sum of opening areas of the plurality of opening portions may be larger than a sum of opening areas of the plurality of bottom surface openings. In such a configuration, since ventilation resistance of the opening portion is lower than that of the bottom surface opening, a flow rate of air flowing through the opening portion is larger than a flow rate of air flowing from a main body to the bottom surface portion. As a result, air inside the toilet can be easily discharged to the outside, feces and urine can be effectively dried, and generation of offensive odor inside the toilet can be further suppressed. In addition, sand powder flies when feces are exchanged or sand is exchanged, but in the present configuration, the sand powder does not accumulate on an upper portion of the sand, but the sand powder is discharged to an outside of the main body, so that air inside the main body is efficiently cleaned.

The bottom surface portion may have a plurality of bottom surface openings which are opening parts through which liquid permeates, and a sum of opening areas of the plurality of opening portions may be smaller than a sum of opening areas of the plurality of bottom surface openings. In such a configuration, a flow rate of air flowing from the outside of the toilet toward the lower portion of the toilet is larger than a flow rate of air discharged to the outside of the toilet. As a result, air inside the toilet moves to a lower layer portion of the toilet through the bottom surface opening, so that it is possible to achieve a configuration in which offensive odor inside the toilet does not easily spread to the outside of the toilet.

The opening region may be formed in the rear wall portion. As a result, the opening region is formed in the vicinity of a back region inside the toilet which is away from the enter/exit portion and where air permeability tends to deteriorate, and air permeability inside the toilet can be effectively improved.

A position of a center line of the opening region in a width direction and a position of a center line of the bottom surface portion in the width direction may not coincide with each other. The pet may prefer to evacuate without stress in a state where there is no enter/exit portion in front of the pet. Such a pet excretes at a position shifted from the center line in the width direction of the toilet. In this regard, since the position of the center line of the opening region is shifted from the position of the center line of the toilet (bottom surface portion), it is possible to dispose the opening region in accordance with an excretion position of the pet that excretes at the position shifted from the center line, and dispose the opening region at a position where it is easy to dry feces and urine. This makes it possible to further suppress generation of offensive odor inside the toilet.

The bottom surface portion may have a plurality of bottom surface openings which are rectangular opening parts through which liquid permeates, and a vertical length of the opening portion may be longer than a length of a short side of the bottom surface opening. In such a configuration, since ventilation resistance of the opening portion is lower than that of the bottom surface opening, a flow rate of air flowing through the opening portion is larger than a flow rate of air flowing from a main body to the bottom surface portion. As a result, air inside the toilet can be easily discharged to the outside, feces and urine can be effectively dried, and generation of offensive odor inside the toilet can be further suppressed. In addition, sand powder flies when feces are exchanged or sand is exchanged, but in the present configuration, the sand powder does not accumulate on an upper portion of the sand, but the sand powder is discharged to an outside of the main body, so that air inside the main body is efficiently cleaned.

The bottom surface portion may have a plurality of bottom surface openings which are rectangular opening parts through which liquid permeates, and a vertical length of the opening portion may be shorter than a length of a long side of the bottom surface opening. In such a configuration, a flow rate of air flowing from the outside of the toilet toward the lower portion of the toilet is larger than a flow rate of air discharged to the outside of the toilet. As a result, air inside the toilet moves to a lower layer portion of the toilet through the bottom surface opening, so that it is possible to achieve a configuration in which offensive odor inside the toilet does not easily spread to the outside of the toilet.

The upper container may have an outer extension portion provided on a wall portion where the opening region is formed and extending outward from the wall portion. By providing the outer extension portion, it is possible to receive urine or the like dripping outward along the slit-shaped opening portion, and appropriately suppress urine or the like from scattering to the outside of the toilet.

The outer extension portion may be provided below a lower end of the opening region. According to such a configuration, urine or the like dripping downward from the opening portion can be appropriately received by the outer extension portion, and it is possible to more appropriately suppress urine or the like from scattering to the outside of the toilet.

The outer extension portion may be provided above an upper end of the bottom surface portion. As a result, urine or the like received by the outer extension portion can be caused to flow to the bottom surface portion, and it is possible to appropriately prevent urine from becoming urinary stones and urine from emitting offensive odor.

The upper container may further have an engagement portion extending downward from a lower end of the outer extension portion and engaging with the bottom surface portion, and an outward extension length of the outer extension portion may be shorter than a vertical length of the engagement portion. By preventing the extension length of the outer extension portion from becoming too long, it is possible to secure strength of the outer extension portion, and suppress urine from excessively accumulating in the outer extension portion and emitting offensive odor.

The outer extension portion may be inclined upward toward its outer end part. By inclining it upward toward the outside, it is possible to achieve a configuration in which urine or the like is less likely to spill outward from the outer extension portion.

One or a plurality of guide grooves may be formed in the outer extension portion along an extending direction. As a result, urine or the like can be appropriately guided to the inside of the toilet, and it is possible to appropriately suppress urine or the like from scattering to the outside of the toilet.

The upper container may further have an inner extension portion provided on the wall portion where the opening region is formed and extending inward from the wall portion. As a result, urine or the like that has reached the opening region can be caused to flow in a direction of the bottom surface portion inside the toilet, and it is possible to appropriately suppress urine or the like from scattering to the outside of the toilet.

The pet toilet system may further include an external additive member provided outside the opening region so as to face the opening region, and cover openings, which are a plurality of openings, may be formed at predetermined intervals in the vertical direction on a surface of the external additive member facing the opening region. As described above, by providing the external additive member outside the opening region, it is possible to more effectively suppress urine or the like from scattering outward. In addition, since the plurality of cover openings are formed at predetermined intervals in the vertical direction in the external additive member, it is possible to avoid deterioration of air permeability due to provision of the external additive member and to suppress generation of offensive odor inside the toilet.

The external additive member may have a cover wall surface provided below the cover opening so as to be continuous with the cover opening in the vertical direction, and a cover non-ventilation portion extending upward from an upper end of the cover wall surface so as to cover a part of the cover opening, and the cover non-ventilation portion may have a first cover part extending upward while inclining outward, and a second cover part that is continuous with an upper end of the first cover part and extends upward so that an outward inclination angle becomes smaller than that of the first cover part. Since the cover non-ventilation portion extends upward so as to cover a part of the cover opening, a flow of air is likely to occur from the lower portion to the upper portion of the cover opening, and it is possible to improve air permeability between the inside and the outside of the toilet through the cover opening. In addition, since the cover non-ventilation portion extends upward while inclining outward, it is possible to increase an area of the cover opening formed between the cover non-ventilation portion and the cover wall surface as compared with a case where the cover non-ventilation portion extends on the same plane as the cover wall surface without inclining outward. As a result, air permeability can be further improved. In addition, since the inclination angle (outward inclination angle) of the second cover part is reduced and the second cover part extends upward at an angle close to perpendicular, it is possible to effectively suppress urine or the like from scattering outward.

The upper container may have an upper container wall surface provided below the opening portion so as to be continuous with the opening portion in the vertical direction, and an upper container non-ventilation portion extending upward from an upper end of the upper container wall surface so as to cover a part of the opening portion, and the upper container non-ventilation portion may have a first part extending upward while inclining outward, and a second part that is continuous with an upper end of the first part and extends upward so that an outward inclination angle becomes smaller than that of the first part. Since the upper container non-ventilation portion extends upward so as to cover a part of the opening portion, a flow of air is likely to occur from the lower portion to the upper portion of the opening portion, and it is possible to improve air permeability between the inside and the outside of the toilet through the opening portion. In addition, since the upper container non-ventilation portion extends upward while inclining outward, the area of the opening portion formed between the upper container non-ventilation portion and the upper container wall surface can be increased as compared with a case where the upper container non-ventilation portion extends on the same plane as the upper container wall surface without inclining outward. As a result, air permeability can be further improved. In addition, since the inclination angle (outward inclination angle) of the second part is reduced and the second part extends upward at an angle close to perpendicular, it is possible to effectively suppress urine or the like from scattering outward.

The upper container may have an upper container wall surface provided below the opening portion so as to be continuous with the opening portion in the vertical direction, and an upper container non-ventilation portion extending upward from the upper end of the upper container wall surface so as to cover a part of the opening portion. Since the upper container non-ventilation portion extends upward so as to cover a part of the opening portion, a flow of air is likely to occur from the lower portion to the upper portion of the opening portion, and it is possible to improve air permeability between the inside and the outside of the toilet through the opening portion.

The upper container non-ventilation portion may have a first part extending upward while inclining outward. Since the upper container non-ventilation portion extends upward while inclining outward, the area of the opening portion formed between the upper container non-ventilation portion and the upper container wall surface can be increased as compared with a case where the upper container non-ventilation portion extends on the same plane as the upper container wall surface without inclining outward. As a result, air permeability can be further improved.

The upper container non-ventilation portion may further have a second part that is continuous with an upper end of the first part and extends upward so that an outward inclination angle becomes smaller than that of the first part. Since the inclination angle (outward inclination angle) of the second part is reduced and the second part extends upward at an angle close to perpendicular, it is possible to effectively suppress urine or the like from scattering outward.

The wall portion in which the opening region is formed may extend upward while inclining inward. According to such a configuration, when the pet discharges urine on the wall portion having the opening region, urine easily flows along the lower portion of the toilet by the wall portion having an angle. As a result, it is possible to suppress urine from remaining in the opening region and to suppress generation of offensive odor inside the toilet.

In the two opening portions adjacent to each other in the vertical direction, the upper opening portion may be located on an inner side than the lower opening portion. According to such a configuration, when the pet discharges urine on the wall portion having the opening region, urine easily flows along the lower portion of the toilet by the wall portion having an angle. As a result, it is possible to suppress urine from remaining in the opening region and to suppress generation of offensive odor inside the toilet.

According to one or more embodiments, it is possible to suppress a room from being filled with offensive odor by excrement.

DESCRIPTION OF THE EMBODIMENTS

Figure 1:
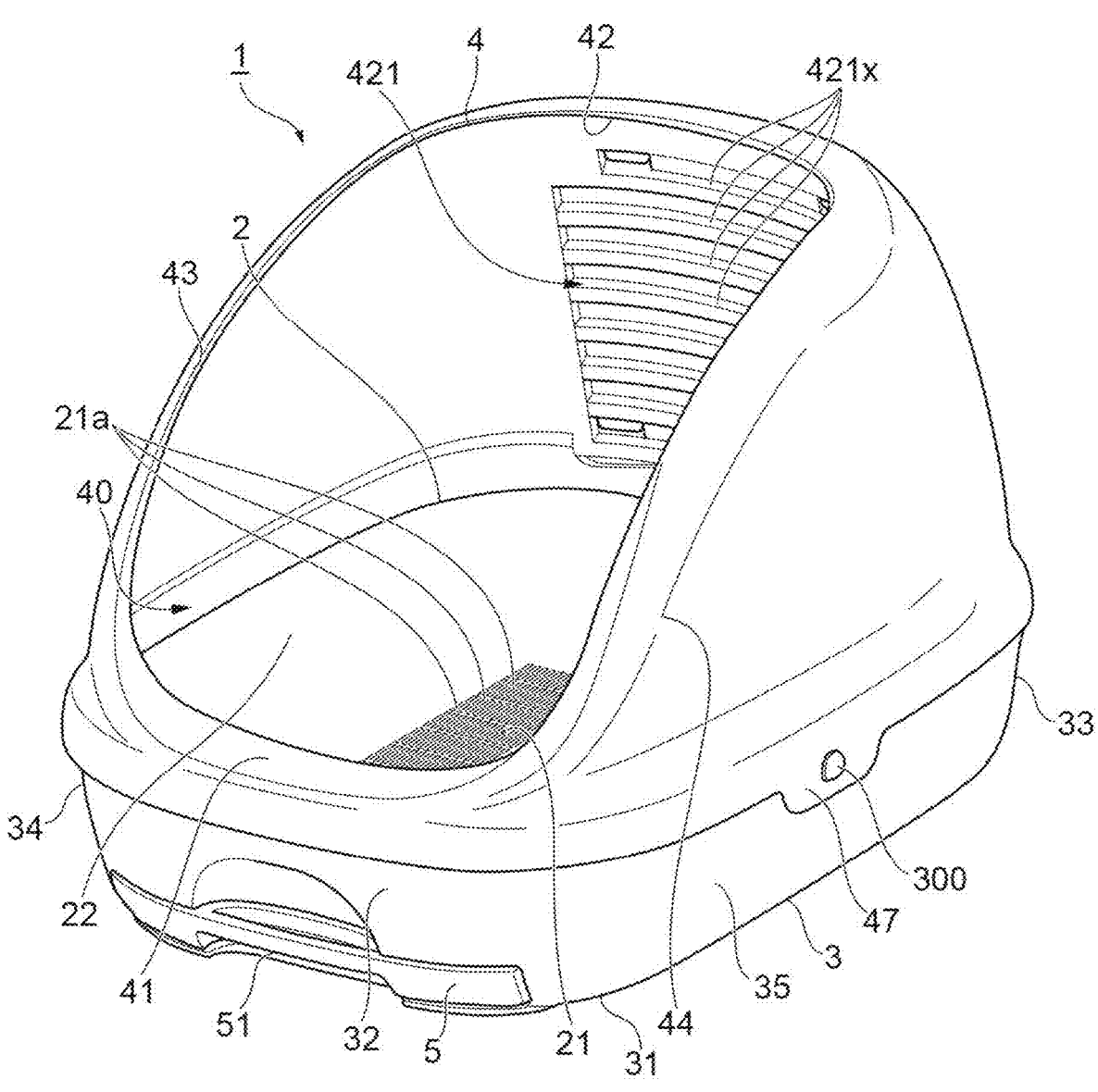
FIG. 1 is a perspective view of a pet toilet system according to one or more embodiments.

Hereinafter, a pet toilet system according to one or more embodiments will be described in detail with reference to the drawings. In the drawings, the same or corresponding parts are denoted by the same reference numerals, and redundant description will be omitted. Note that the drawings are schematic, and ratios of dimensions and the like may be different from actual ones.

FIG. 1 is a perspective view of a pet toilet system 1 according to one or more embodiments. The pet toilet system 1 according to one or more embodiments is, for example, a toilet system for excretion of a cat that is a pet. The pet toilet system 1 according to one or more embodiments may be a toilet system for excretion of a pet other than a cat.

As illustrated in FIG. 1, the pet toilet system 1 includes an excretion container 2, a lower container 3, an upper container 4, and a tray 5. In the pet toilet system 1, a so-called half-type upper container 4 in which an upper side of the upper container 4 is opened is adopted.

Hereinafter, there is a case where a vertical direction of the pet toilet system 1 is referred to as a "vertical direction", a depth direction which is a longitudinal direction is referred to as a "front-rear direction", and a direction orthogonal to the vertical direction and the front-rear direction is referred to as a "width direction". In the "vertical direction", a direction toward the upper container 4 as viewed from the lower container 3 is described as "upper", and a direction toward the lower container 3 as viewed from the upper container 4 is described as "lower". In addition, in the "front-rear direction", a direction toward an opening portion 40 as viewed from a rear wall portion 42 of the upper container 4 is described as "front", and a direction toward the rear wall portion 42 as viewed from the opening portion 40 is described as "rear".

The excretion container 2 is a container for accommodating toilet sand (not illustrated). The excretion container 2 has a liquid-permeable bottom surface portion 21 and a wall surface 22. The toilet sand is a granular material capable of absorbing or permeating liquid such as urine. The toilet sand is formed by molding, for example, bentonite that covers feces and can absorb liquid, wood or paper coated with water repellent coating, or zeolite, silica gel, mineral or the like having deodorizing power into a substantially spherical shape having a diameter of about several mm to several cm, and known toilet sand may be used. When solidified sand is used as the toilet sand, the liquid-permeable bottom surface portion 21 may be clogged. Therefore, the solidified sand may not be adopted in the present pet toilet system 1. The toilet sand is disposed on the bottom surface portion 21.

The bottom surface portion 21 is a plate-shaped member in which bars are formed in a ducklike shape, and a plurality of regular bottom surface openings 21a are provided between the bars. The bottom surface opening 21a is a rectangular opening part through which liquid permeates. The bottom surface portion 21 is formed in a substantially rectangular shape in plan view. The wall surface 22 is a portion formed to rise upward from peripheral edges of the bottom surface portion 21. That is, the wall surface 22 is formed so as to rise upward from both end portions in the front-rear direction and both end portions in the width direction of the bottom surface portion 21. Note that the bottom surface portion 21 may have a shape other than a rectangular shape in plan view as long as the toilet sand can be accommodated therein. The excrement excreted by the pet permeates through the toilet sand, permeates through gaps of the bottom surface portion 21 formed by the ducklike bars, and falls into the lower container 3 (specifically, the tray 5 held in the lower container 3) disposed below the excretion container 2. The excretion container 2 is formed of, for example, a resin such as plastic, but is not limited thereto.

The tray 5 is disposed below the excretion container 2 and accommodates an absorption sheet (not illustrated) that absorbs liquid (excrement) that has permeated through the bottom surface portion 21. On the front side of the tray 5, a tray handle portion 51 that can be pulled out toward the front side by a user's hand is formed. The tray handle portion 51 may be formed not only on the front side but also on the rear side of the tray 5. In this case, the tray 5 has a front-back symmetrical shape. In this way, since the tray 5 has a front-rear symmetrical shape and the tray handle portion 51 is formed on both the front side and the rear side, it is possible to pull out the tray 5 through the tray handle portion 51 even when the front and rear of the tray 5 are switched, for example. The region in which the liquid is absorbed in the absorption sheet is determined to some extent. However, by switching the front and rear of the tray 5, the orientation of the absorption sheet is changed, and liquid can be absorbed in a region different from the region in which liquid has already been absorbed. In this way, by switching the front and rear of the tray 5, one absorption sheet can be effectively used to the maximum. The tray 5 is formed to be slightly smaller than the lower container 3 so as to be accommodated inside the lower container 3 and to be swingable. The tray 5 is pulled out in a horizontal direction in one or more embodiments, but is not limited thereto, and may be pulled out obliquely upward, for example.

The lower container 3 is a container that holds the tray 5. The lower container 3 accommodates the tray 5 so that the tray 5 can be swingably pulled out inside the lower container 3. The lower container 3 includes a bottom surface portion 31 and wall surfaces 32, 33, 34, and 35. The bottom surface portion 31 is a portion facing an installation surface on which the pet toilet system 1 is installed. The bottom surface portion 31 is formed in a rectangular shape in plan view. A central part of the bottom surface portion 31 may be an opening.

The wall surface 32 is a portion formed to rise upward from a front end portion of the bottom surface portion 31. An opening for pulling out the tray 5 is formed on the wall surface 32. The wall surface 33 is a portion formed to rise upward from a rear end portion of the bottom surface portion 31. The wall surfaces 34 and 35 are portions formed so as to rise upward from width-direction both end portions of the bottom surface portion 31. The wall surfaces 32, 33, 34, and 35 are continuously formed, and an entire periphery of the bottom surface portion 31 is surrounded by the wall surfaces 32, 33, 34, and 35. The wall surface 22 of the excretion container 2 is fitted to upper end portions of the wall surfaces 32, 33, 34, and 35. The upper container 4 is attached so as to cover the upper end portions of the wall surfaces 32, 33, 34, and 35. Connecting portions 300 connected to hooks 47 of the upper container 4 are provided at central portions in the front-rear direction and upper end portions of the wall surfaces 34 and 35.

The upper container 4 is a container that is disposed above the excretion container 2 and has an opening portion 40 through which the pet enters and exits. The upper container 4 is a so-called half-type upper container whose upper side is opened as described above.

Figures 2A, 2B, 2C:
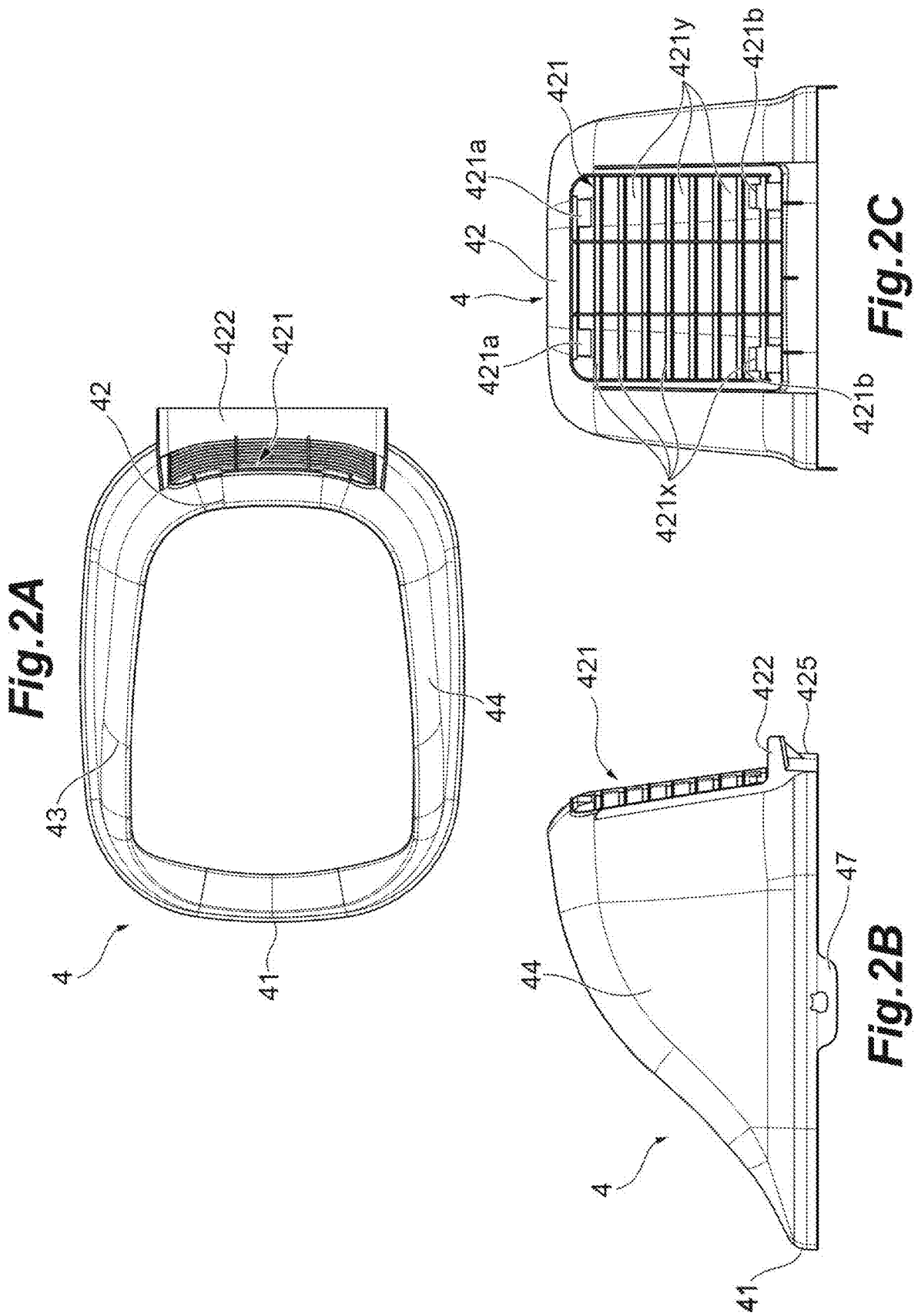
FIG. 2A is a plan view of an upper container illustrated in FIG. 1.
FIG. 2B is a side view of the upper container illustrated in FIG. 1.
FIG. 2C is a rear view of the upper container illustrated in FIG. 1.
Figures 3A, 3B, 3C:
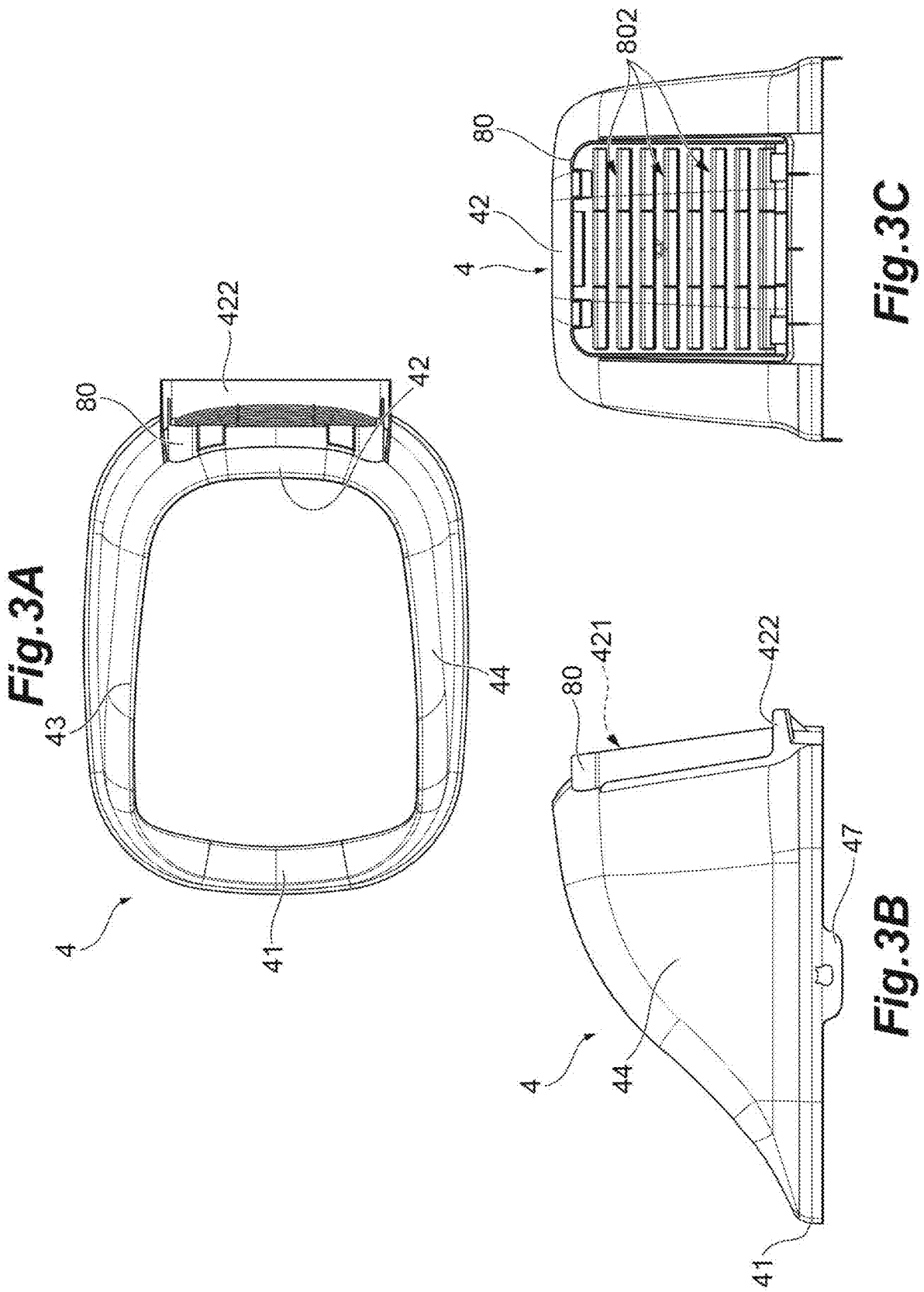
FIG. 3A is a plan view of an upper container to which an external additive member is attached.
FIG. 3B is a side view of the upper container to which the external additive member is attached.
FIG. 3C is a rear view of the upper container to which the external additive member is attached.
Figures 4A, 4B, 4C:
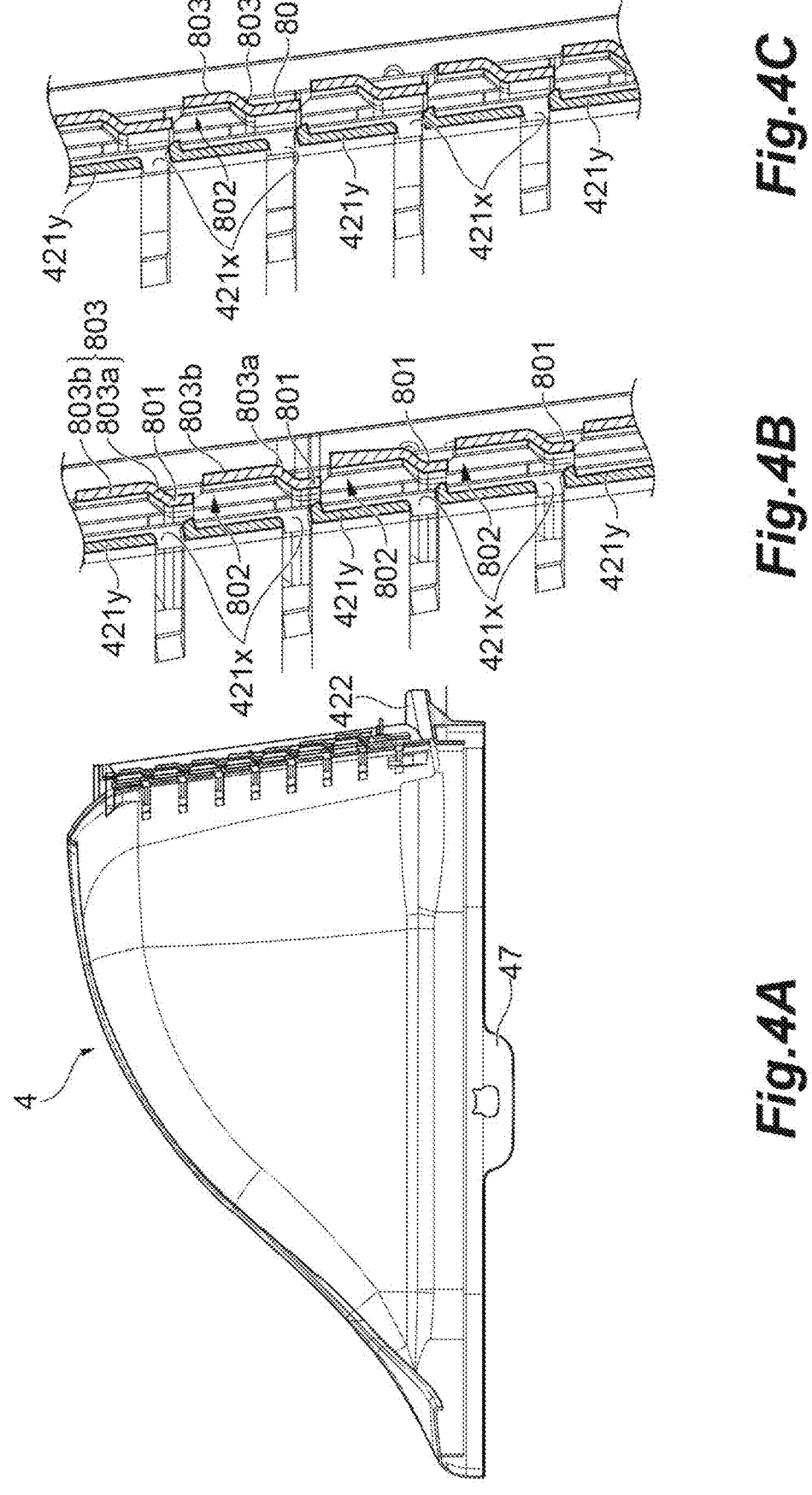
FIG. 4A is a cross-sectional view of the upper container to which the external additive member is attached.
FIG. 4B is a partially enlarged view of the cross-sectional view.
FIG. 4C is a partially enlarged view of the cross-sectional view.

Note that instead of the so-called half-type upper container, a so-called full-cover type upper container that covers the upper end portions of the wall surfaces 32, 33, 34, and 35 (upper portions of the wall surfaces 32, 33, 34, and 35 are not opened) may be adopted. The upper container in this case may have, for example, a fixed hood covering the upper end portions of the wall surfaces 32, 33, 34, and 35, and a movable hood rotatable (or slidable) with respect to the fixed hood. Hereinafter, a detailed configuration of the half-type upper container 4 will be described with reference to FIGS. 2A-2C, 3A-3C, and 4A-4C. FIG. 2A is a plan view, FIG. 2B is a side view, and FIG. 2C is a rear view of the upper container 4 illustrated in FIG. 1. FIG. 3A is a plan view, FIG. 3B is a side view, and FIG. 3C is a rearview of the upper container 4 to which an external additive member 80 is attached. FIG. 4A is a cross-sectional view of the upper container 4 to which the external additive member 80 is attached, FIG. 4B is a partially enlarged view of the cross-sectional view, and FIG. 4C is a partially enlarged view of the cross-sectional view.

As illustrated in FIGS. 1 and 2A, the upper container 4 includes a front wall portion 41, a rear wall portion 42, and a pair of side wall portions 43 and 44. In one or more embodiments, the front wall portion 41, the rear wall portion 42, and the pair of side wall portions 43 and 44 are integrally formed. The upper container 4 does not have a bottom surface portion and penetrates in the vertical direction.

The front wall portion 41 is a portion provided in front of and below the opening portion 40 (enter/exit portion) through which the pet enters and exits. The front wall portion 41 is attached to the upper end portion of the wall surface 32 of the lower container 3, and extends in the vertical direction and in the width direction along the wall surface 32.

The pair of side wall portions 43 and 44 are portions provided so as to face each other on width-direction both sides of the opening portion 40 and portions extending in the front-rear direction. Front end portions of the side wall portions 43 and 44 are continuous with the width-direction both end portions of the front wall portion 41. The side wall portions 43 and 44 are formed by curved surfaces projecting outward in the width direction from the upper end portions toward the lower side. The side wall portions 43 and 44 are attached to the upper end portions of the wall surfaces 34 and 35 of the lower container 3. As illustrated in FIG. 1, the hooks 47 extending downward are provided at substantially the center in the front-rear direction of the lower end portions of the side wall portions 43 and 44. That is, the upper container 4 further has the hooks 47 provided at the lower end portions of the side wall portions 43 and 44 and connected to the connecting portions 300 of the lower container 3. By connecting the hooks 47 to the connecting portions 300, the upper container 4 is attached and fixed to the lower container 3.

As illustrated in FIG. 1, the rear wall portion 42 is a portion facing the opening portion 40 in the front-rear direction, and is a portion extending in the width direction at the rear end portion of the upper container 4. Width-direction both end portions of the rear wall portion 42 are continuous with the rear end portions of the side wall portions 43 and 44. The rear wall portion 42 is formed by a curved surface projecting rearward from the upper end portion toward the lower side. The rear wall portion 42 is attached to the upper end portion of the wall surface 33 of the lower container 3.

As illustrated in FIG. 1, an opening region 421 including a plurality of opening portions 421$x$ is formed in a region of the upper container 4 above the bottom surface portion 21 of the excretion container 2. The rear wall portion 42 which is a wall portion in which the opening region 421 is formed may extend upward while inclining inward. In one or more embodiments, the opening region 421 is formed in the rear wall portion 42. The opening region 421 formed in the rear wall portion 42 will be described with reference to FIG. 2C.

As illustrated in FIG. 2C, a plurality of slit-shaped opening portions 421$x$ extending in the width direction of the rear wall portion 42 are formed in the opening region 421. The opening portion 421$x$ has a width-direction length (horizontal width) longer than a vertical length (height). In the opening region 421, the plurality of opening portions 421$x$ are formed at predetermined intervals in the vertical direction. That is, in the opening region 421, the opening portions 421$x$ and upper container wall surfaces 421$y$ having no opening are alternately and repeatedly formed in the vertical direction. In the two opening portions 421$x$ adjacent to each other in the vertical direction, the upper opening portion 421$x$ is located on the inner side of the toilet than the lower opening portion 421$x$. In the rear wall portion 42, about 20% to 60%, for example, about 40% to 45% of the entire region of the rear wall portion 432 may be the opening region 421

(region including the opening portion 421x). A vertical length of the opening region 421 may be longer than a vertical length of the excretion container 2. In the rear wall portion 42, about 3% to 20%, for example, about 7% to 15% (for example, 5% or more) of the entire region of the rear wall portion 432 may be the region of the plurality of opening portions 421x.

A vertical length of one opening portion 421x is shorter than the vertical length of the excretion container 2. In addition, the width-direction length of the opening portion 421x may be longer than the width-direction length of the bottom surface portion 21 (see FIG. 1) of the excretion container 2. Alternatively, the width-direction length of the opening portion 421x may be shorter than the width-direction length of the bottom surface portion 21 (see FIG. 1) of the excretion container 2. The vertical length of the opening portion 421x may be longer than the length of the short side of the bottom surface opening 21a of the bottom surface portion 21. Alternatively, the vertical length of the opening portion 421x may be shorter than the length of the long side of the bottom surface opening 21a. A sum of opening areas of the plurality of opening portions 421x may be larger than a sum of opening areas of the plurality of bottom surface openings 21a. Alternatively, the sum of the opening areas of the plurality of opening portions 421x may be smaller than the sum of the opening areas of the plurality of bottom surface openings 21a.

As illustrated in FIG. 2C, attachment recesses 421a, 421a, 421b, and 421b for attaching the external additive member 80 to be described later are formed at substantially four corners of the opening region 421. The attachment recesses 421a and 421a are formed at upper end portions and width-direction both end portions of the opening region 421. The attachment recesses 421b and 421b are formed at lower end portions and width-direction both end portions of the opening region 421.

As illustrated in FIGS. 2A and 2B, the upper container 4 further has an outer extension portion 422 provided on the rear wall portion 42 which is a wall portion where the opening region 421 is formed and extending outward from the rear wall portion 42. The outer extension portion 422 is configured to receive urine or the like dripping along the opening portion 421x to the outside of the toilet and return the urine or the like to the inside of the toilet. The outer extension portion 422 is provided below the lower end of the opening region 421. Further, the outer extension portion 422 may be provided above an upper end of the bottom surface portion 21 (see FIG. 1).

The outer extension portion 422 is inclined upward toward its outer end part. As a result, urine or the like received by the outer extension portion 422 easily flows (is easily returned) toward the inside of the toilet. The upper container 4 has an engagement portion 425 (see FIG. 2B) extending downward from the lower end of the outer extension portion 422. For example, an outward extension length of the outer extension portion 422 is shorter than a vertical length of the engagement portion 425.

As illustrated in FIGS. 3A to 3C, the external additive member 80 is attached to the upper container 4 according to one or more embodiments. The external additive member 80 is provided outside the opening region 421 so as to face the opening region 421. The external additive member 80 is attached to the outside of the opening region 421 by being partially inserted into the attachment recesses 421a, 421a, 421b, and 421b (see FIG. 2C) at the four corners of the opening region 421. On a surface of the external additive member 80 facing the opening region 421, cover openings 802 as a plurality of openings are formed at predetermined intervals in the vertical direction. A positional relationship and the like between the opening region 421 and the external additive member 80 will be described with reference to FIGS. 4A-4C.

FIG. 4A is a cross-sectional view of the upper container 4 to which the external additive member 80 is attached. FIG. 4B is a partially enlarged view of FIG. 4A (a partially enlarged view of the opening region 421 and the external additive member 80). As illustrated in FIG. 4B, in the opening region 421, the opening portions 421x and the upper container wall surfaces 421y having no opening are alternately and repeatedly formed in the vertical direction. As illustrated in FIG. 4B, in the external additive member 80, the cover openings 802 and cover wall surfaces 801 having no opening are alternately and repeatedly formed in the vertical direction. The cover wall surface 801 is a wall surface provided below the cover opening 802 so as to be continuous with the cover opening 802 in the vertical direction.

The external additive member 80 further has a cover non-ventilation portion 803 extending upward from an upper end of the cover wall surface 801 so as to cover a part of the cover opening 802. The cover non-ventilation portion 803 has a first cover part 803a and a second cover part 803b. The first cover part 803a is a portion extending upward while inclining outward (outside the toilet). The second cover part 803b is a portion extending upward (for example, perpendicularly) so that an outward inclination angle becomes smaller than that of the first cover part 803a. In the configuration according to one or more embodiments, the second cover part 803b extends upward substantially parallel to the upper container wall surface 421y. Most of the region of the cover opening 802 in the vertical direction is covered with the second cover part 803b and the like, and only a small part corresponding to the region from an upper end of the second cover part 803b to the lower end of the cover wall surface 801 above the second cover part 803b is not covered with the second cover part 803b and the like. The extension length of the first cover part 803a may be, for example, about the same as the extension length of the cover wall surface 801. The extension length of the second cover part 803b may be sufficiently longer than the extension length of the cover wall surface 801 and the first cover part 803a, for example. For example, the cover wall surface 801 and the first cover part 803a exist on an extension line (an extension line in the front-rear direction) of the opening portion 421x of the upper container 4.

Note that the positional relationship and the length of the cover wall surface 801, the cover opening 802, and the cover non-ventilation portion 803 in the external additive member 80 are not limited to the above. For example, as illustrated in FIG. 4C, the length of the cover wall surface 801 may be longer than that of the configuration illustrated in FIG. 4B, and the length of the second cover part 803b may be shorter than that of the configuration illustrated in FIG. 4B. That is, a connection portion (folded portion) between the cover wall surface 801 and the first cover part 803a may be provided above the configuration illustrated in FIG. 4B. When the configuration of FIG. 4B is compared with the configuration of FIG. 4C, the configuration of FIG. 4B in which the connection portion (folding portion) between the cover wall surface 801 and the first cover part 803a is provided relatively downward can effectively suppress urine from scattering and splashing out of the toilet.

Next, functions and effects of the pet toilet system 1 according to one or more embodiments will be described.

A pet toilet system 1 according to one or more embodiments includes an excretion container 2 configured to accommodate toilet sand and having a liquid-permeable bottom surface portion 21, a tray 5 disposed below the excretion container 2 and configured to accommodate an absorption sheet that absorbs liquid that has permeated through the bottom surface portion 21, a lower container 3 configured to hold the tray 5, and an upper container 4 disposed above the excretion container 2 and having a front wall portion 41 in which an opening portion 40 through which a pet enters and exits is formed, a pair of side wall portions 43 and 44 provided so as to face each other on width-direction both sides of the opening portion 40 and extending in a front-rear direction, and a rear wall portion 42 facing the opening portion 40 in the front-rear direction, in which an opening region 421 including a plurality of opening portions 421x is formed in a region of the upper container 4 above the bottom surface portion 21 of the excretion container 2.

In the pet toilet system 1 according to one or more embodiments, the opening region 421 including the plurality of opening portions 421x is formed in a region of the upper container 4 above the bottom surface portion 21 of the excretion container 2. According to such a configuration, air permeability above the bottom surface portion 21 where feces and urine are held is improved. This makes it easy to dry feces and urine held on the bottom surface portion 21, and it is possible to suppress generation of offensive odor inside the toilet as compared with a state where toilet sand is wet with urine and a state where feces are wet. In addition, since the opening portion 421x is formed in the region of the upper container 4 above the bottom surface portion 21, for example, liquid such as urine that has permeated through the bottom surface portion 21 and flowed downward, and cat sand chips and powder (powder or the like) to which cats and feces adhere are less likely to scatter from the opening portion 421x to the outside of the toilet. As a result, it is possible to suppress the outside of the toilet from smelling bad. As described above, according to the pet toilet system 1 according to one or more embodiments, it is possible to suppress a room from being filled with offensive odor by excrement.

In addition, since the opening region 421 is formed, light easily enters the inside of the toilet (the inside of the toilet becomes bright), it is possible to easily notice dirt inside the toilet, and the pet can excreta with security.

A slit-shaped opening portion 421x may be formed in the opening region 421. Although air passes through such a slit-shaped opening portion 421x, liquid, powder, or the like hardly passes through the slit-shaped opening portion 421x, so that it is possible to more appropriately suppress liquid such as urine, powder, or the like from scattering from the opening portion 421x to the outside of the toilet.

The opening portion 421x may have a width-direction length longer than a vertical length. By making the width-direction length of the opening portion 421x sufficiently long, it is possible to improve air permeability in a wide range in the width direction on the bottom surface portion 21, and air can be efficiently moved. This makes it possible to further suppress generation of offensive odor inside the toilet. Furthermore, it is conceivable that the above-described liquid, powder, or the like is scattered in a height direction (vertical direction) when the pet scrapes the sand. In this regard, by making the length in the vertical direction shorter than that in the width direction, it is possible to suppress liquid, powder, or the like from coming out of the toilet from the opening portion due to the pet scraping the sand described above.

In the opening region 421, the plurality of opening portions 421x may be formed at predetermined intervals in the vertical direction. As a result, it is possible to improve air permeability in a wide range in the vertical direction on the bottom surface portion 21, and air can be efficiently moved. This makes it possible to further suppress generation of offensive odor inside the toilet.

In a wall portion of the upper container 4 in which the opening region 421 is formed, a region of 5% or more of an entire region of the wall portion may be a region of the opening portion 421x. As a result, the region of the opening portion 421x is sufficiently secured to improve air permeability, and it is possible to appropriately suppress liquid, powder, or the like from scattering to the outside of the toilet due to an excessive increase in the region of the opening portion 421x.

A vertical length of the opening region 421 may be longer than a vertical length of the excretion container 2. In this way, by sufficiently securing the vertical length of the opening region 421, it is possible to improve air permeability in a wide range in the vertical direction on the bottom surface portion 21, and air can be efficiently moved. This makes it possible to further suppress generation of offensive odor inside the toilet.

A vertical length of one opening portion 421x formed in the opening region 421 may be shorter than the vertical length of the excretion container 2. As described above, since a depth of the excretion container 2 is sufficiently secured, and the vertical length of the opening portion 421x is set not to be too long, it is possible to appropriately suppress liquid, powder, or the like from scattering from the opening portion 421x to the outside of the toilet.

The width-direction length of the opening portion 421x may be longer than a width-direction length of the bottom surface portion 21. As a result, it is possible to improve air permeability in a wide range of an entire region in the width direction on the bottom surface portion 21, and air can be efficiently moved. This makes it possible to further suppress generation of offensive odor inside the toilet.

The width-direction length of the opening portion 421x may be shorter than the width-direction length of the bottom surface portion 21. In such a configuration, a probability that liquid, powder, or the like reaches the opening portion, that is, a probability that liquid, powder, or the like leaks from the opening portion 421x can be reduced.

The bottom surface portion 21 may have a plurality of bottom surface openings 21a which are opening parts through which liquid permeates, and a sum of opening areas of the plurality of opening portions 421x may be larger than a sum of opening areas of the plurality of bottom surface openings 21a. In such a configuration, since ventilation resistance of the opening portion 421x is lower than that of the bottom surface opening 21a, a flow rate of air flowing through the opening portion 421x is larger than a flow rate of air flowing from a main body to the bottom surface portion 21. As a result, air inside the toilet can be easily discharged to the outside, feces and urine can be effectively dried, and generation of offensive odor inside the toilet can be further suppressed. In addition, sand powder flies when feces are exchanged or sand is exchanged, but in the present configuration, the sand powder does not accumulate on an upper portion of the sand, but the sand powder is discharged to an outside of the main body, so that air inside the main body is efficiently cleaned.

The bottom surface portion 21 may have a plurality of bottom surface openings 21a which are opening parts through which liquid permeates, and a sum of opening areas of the plurality of opening portions 421x may be smaller than a sum of opening areas of the plurality of bottom surface openings 21a. In such a configuration, a flow rate of air flowing from the outside of the toilet toward the lower portion of the toilet is larger than a flow rate of air discharged to the outside of the toilet. As a result, air inside the toilet moves to the lower layer portion of the toilet through the bottom surface opening 21a, so that it is possible to achieve a configuration in which offensive odor inside the toilet does not easily spread to the outside of the toilet.

The opening region 421 may be formed in the rear wall portion 42. As a result, the opening region 421 is formed in the vicinity of a back region inside the toilet which is away from the enter/exit portion for the pet and where air permeability tends to deteriorate, and air permeability inside the toilet can be effectively improved.

The bottom surface portion 21 may have a plurality of bottom surface openings 21a which are rectangular opening parts through which liquid permeates, and a vertical length of the opening portion 421x may be longer than a length of a short side of the bottom surface opening 21a. In such a configuration, since ventilation resistance of the opening portion 421x is lower than that of the bottom surface opening 21a, a flow rate of air flowing through the opening portion 421x is larger than a flow rate of air flowing from a main body to the bottom surface portion 21. As a result, air inside the toilet can be easily discharged to the outside, feces and urine can be effectively dried, and generation of offensive odor inside the toilet can be further suppressed. In addition, sand powder flies when feces are exchanged or sand is exchanged, but in the present configuration, the sand powder does not accumulate on an upper portion of the sand, but the sand powder is discharged to an outside of the main body, so that air inside the main body is efficiently cleaned.

The bottom surface portion 21 may have a plurality of bottom surface openings 21a which are rectangular opening parts through which liquid permeates, and a vertical length of the opening portion 421x may be shorter than a length of a long side of the bottom surface opening 21a. In such a configuration, a flow rate of air flowing from the outside of the toilet toward the lower portion of the toilet is larger than a flow rate of air discharged to the outside of the toilet. As a result, air inside the toilet moves to a lower layer portion of the toilet through the bottom surface opening, so that it is possible to achieve a configuration in which offensive odor inside the toilet does not easily spread to the outside of the toilet.

The upper container 4 may have an outer extension portion 422 provided on a wall portion where the opening region 421 is formed and extending outward from the wall portion. By providing the outer extension portion 422, it is possible to receive urine or the like dripping outward along the slit-shaped opening portion 421x, and appropriately suppress urine or the like from scattering to the outside of the toilet.

The outer extension portion 422 may be provided below a lower end of the opening region 421. According to such a configuration, urine or the like dripping downward from the opening portion 421x can be appropriately received by the outer extension portion 422, and it is possible to more appropriately suppress urine or the like from scattering to the outside of the toilet.

The outer extension portion 422 may be provided above the upper end of the bottom surface portion 21. As a result, urine or the like received by the outer extension portion 422 can be caused to flow to the bottom surface portion 21, and it is possible to appropriately prevent urine from becoming urinary stones and urine from emitting offensive odor.

The upper container 4 may further have an engagement portion 425 extending downward from a lower end of the outer extension portion 422 and engaging with the bottom surface portion 21, and an outward extension length of the outer extension portion 422 may be shorter than a vertical length of the engagement portion 425. By preventing the extension length of the outer extension portion 422 from becoming too long, it is possible to secure strength of the outer extension portion 422, and suppress urine from excessively accumulating in the outer extension portion 422 and emitting offensive odor.

The outer extension portion 422 may be inclined upward toward its outer end part. By inclining it upward toward the outside, it is possible to achieve a configuration in which urine or the like is less likely to spill outward from the outer extension portion 422.

The pet toilet system 1 may further include an external additive member 80 provided outside the opening region 421 so as to face the opening region 421, and cover openings 802, which are a plurality of openings, may be formed at predetermined intervals in the vertical direction on a surface of the external additive member 80 facing the opening region 421. As described above, by providing the external additive member 80 outside the opening region 421, it is possible to more effectively suppress urine or the like from scattering outward. In addition, since the plurality of cover openings 802 are formed at predetermined intervals in the vertical direction in the external additive member 80, it is possible to avoid deterioration of air permeability due to provision of the external additive member 80 and to suppress generation of offensive odor inside the toilet.

The external additive member 80 may have a cover wall surface 801 provided below the cover opening 802 so as to be continuous with the cover opening 802 in the vertical direction, and a cover non-ventilation portion 803 extending upward from the upper end of the cover wall surface 801 so as to cover a part of the cover opening 802, and the cover non-ventilation portion 803 may have a first cover part 803a extending upward while inclining outward, and a second cover part 803b that is continuous with an upper end of the first cover part 803a and extends upward so that an outward inclination angle becomes smaller than that of the first cover part 803a. Since the cover non-ventilation portion 803 extends upward so as to cover a part of the cover opening 802, a flow of air is likely to occur from the lower portion to the upper portion of the cover opening 802, and it is possible to improve air permeability between the inside and the outside of the toilet through the cover opening 802. In addition, since the cover non-ventilation portion 803 extends upward while inclining outward, an area of the cover opening 802 formed between the cover non-ventilation portion 803 and the cover wall surface 801 can be increased as compared with a case where the cover non-ventilation portion 803 extends on the same plane as the cover wall surface 801 without inclining outward. As a result, air permeability can be further improved. In addition, since the inclination angle (outward inclination angle) of the second cover part 803b is reduced and the second cover part 803b extends upward at an angle close to perpendicular, it is possible to effectively suppress urine or the like from scattering outward.

The rear wall portion 42 which is a wall portion in which the opening region 421 is formed may extend upward while inclining inward. According to such a configuration, when the pet discharges urine on the rear wall portion 42 having the opening region 421, urine easily flows along the lower portion of the toilet by the rear wall portion 42 having an angle. As a result, it is possible to suppress urine from remaining in the opening region 421 and to suppress generation of offensive odor inside the toilet.

In the two opening portions 421x adjacent to each other in the vertical direction, the upper opening portion 421x may be located on the inner side of the toilet than the lower opening portion 421x. According to such a configuration, when the pet discharges urine on the rear wall portion 42 having the opening region 421, urine easily flows along the lower portion of the toilet by the rear wall portion 42 having an angle. As a result, it is possible to suppress urine from remaining in the opening region 421 and to suppress generation of offensive odor inside the toilet.

Although one or more embodiments have been described above, the present invention is not limited to the above embodiments.

Figures 5A, 5B:
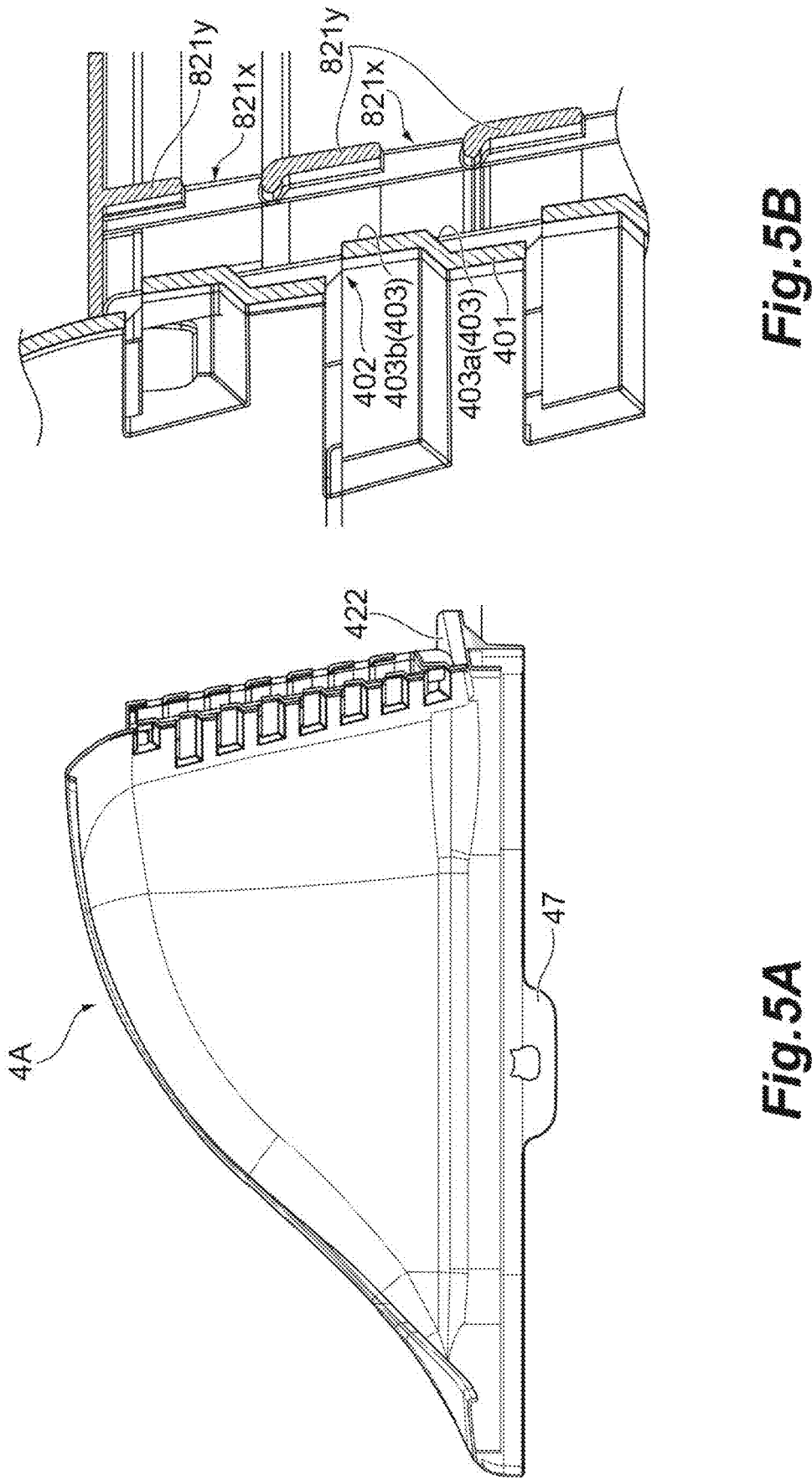
FIG. 5A is a cross-sectional view of an upper container to which an external additive member according to a modification is attached
FIG. 5B is a partially enlarged view of the cross-sectional view.

FIG. 5A is a cross-sectional view of an upper container 4A to which an external additive member according to a modification is attached, and FIG. 5B is a partially enlarged view of the cross-sectional view. The upper container 4A illustrated in FIGS. 5A and 5B has a configuration substantially similar to that of the upper container 4 described in the embodiments, but the configuration in the opening region and the configuration in the external additive member are partially different.

As illustrated in FIG. 5B, the upper container 4A has an upper container wall surface 401 provided below an opening portion 402 so as to be continuous with the opening portion 402 in the vertical direction, and an upper container non-ventilation portion 403 extending upward from an upper end of the upper container wall surface 401 so as to cover a part of the opening portion 402. The upper container non-ventilation portion 403 has a first part 403a extending upward while inclining outward, and a second part 403b that is continuous with an upper end of the first part 403a and extends upward so that an outward inclination angle becomes smaller than that of the first part. In the external additive member provided outside the opening region, opening portions 821x and external additive member wall surfaces 821y having no opening are alternately and repeatedly formed in the vertical direction. As described above, in the upper container 4A, the configurations of the opening region and the external additive member are opposite to those of the upper container 4. In such a configuration in which the upper container non-ventilation portion 403 extends upward so as to cover a part of the opening portion 402, a flow of air is likely to occur from the lower portion to the upper portion of the opening portion 402, and it is possible to improve air permeability between the inside and the outside of the toilet through the opening portion 402. In addition, since the upper container non-ventilation portion 403 extends upward while inclining outward, the area of the opening portion 402 formed between the upper container non-ventilation portion 403 and the upper container wall surface 401 can be increased as compared with a case where the upper container non-ventilation portion 403 extends on the same plane as the upper container wall surface 401 without inclining outward. As a result, air permeability can be further improved. In addition, since the inclination angle (outward inclination angle) of the second part 403b is reduced and the second part 403b extends upward at an angle close to perpendicular, it is possible to effectively suppress urine or the like from scattering outward.

Note that the external additive member is not an essential component, and the external additive member may not be attached in the configuration of the upper container 4A described above.

FIGS. 6 to 11 are each a cross-sectional view of an upper container according to a modification.

Figure 6:
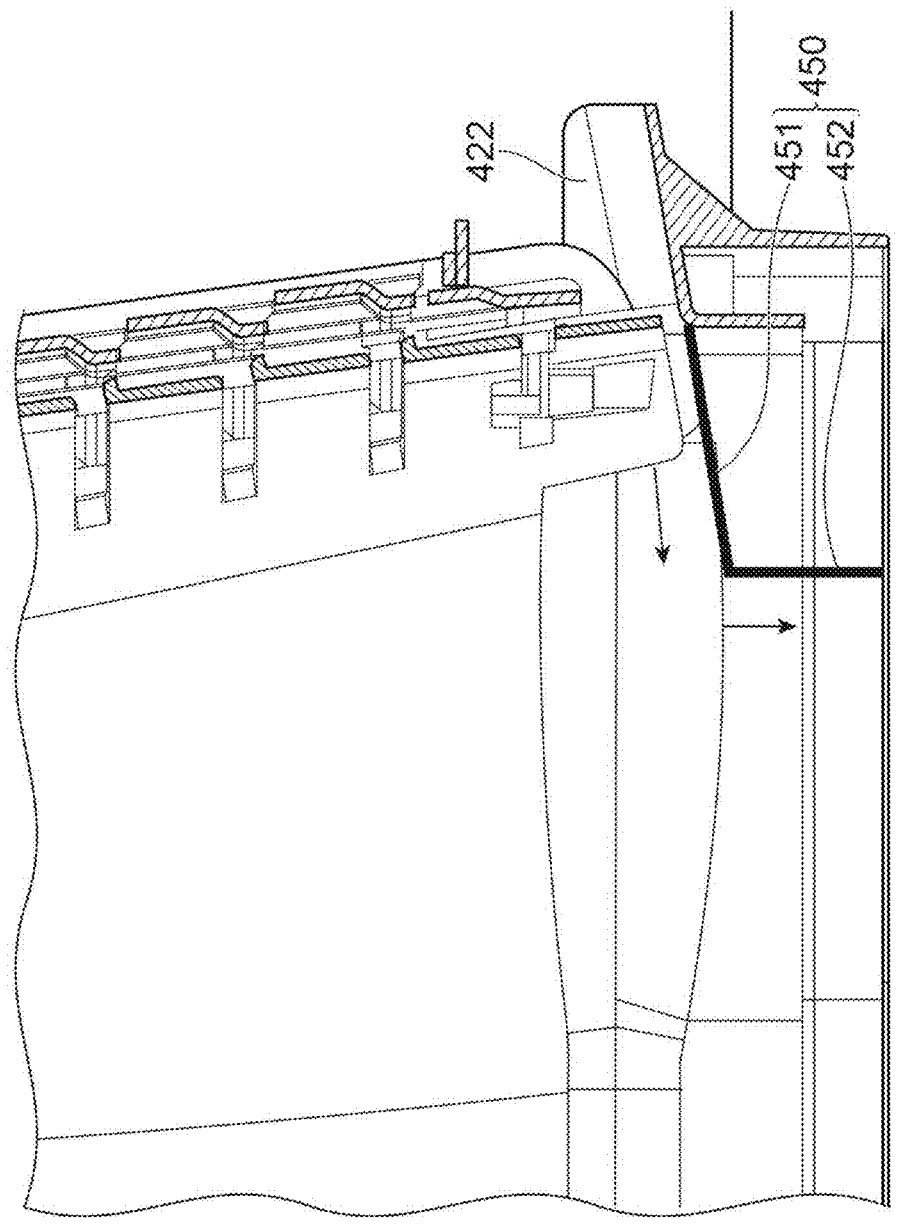
FIG. 6 is a cross-sectional view of the upper container according to a modification.

As illustrated in FIG. 6, the upper container may further have an inner extension portion 450 provided in a wall portion (here, a rear wall portion) in which the opening region is formed and extending inward from the wall portion. The inner extension portion 450 may have a first extension portion 451 that is continuous with the outer extension portion 422 and extends inward, and a second extension portion 452 extending downward from a distal end of the first extension portion 451. According to such a configuration, urine or the like that has reached the opening region can be caused to flow in a direction of the bottom surface portion inside the toilet, and it is possible to appropriately suppress urine or the like from scattering to the outside of the toilet.

Figure 7:
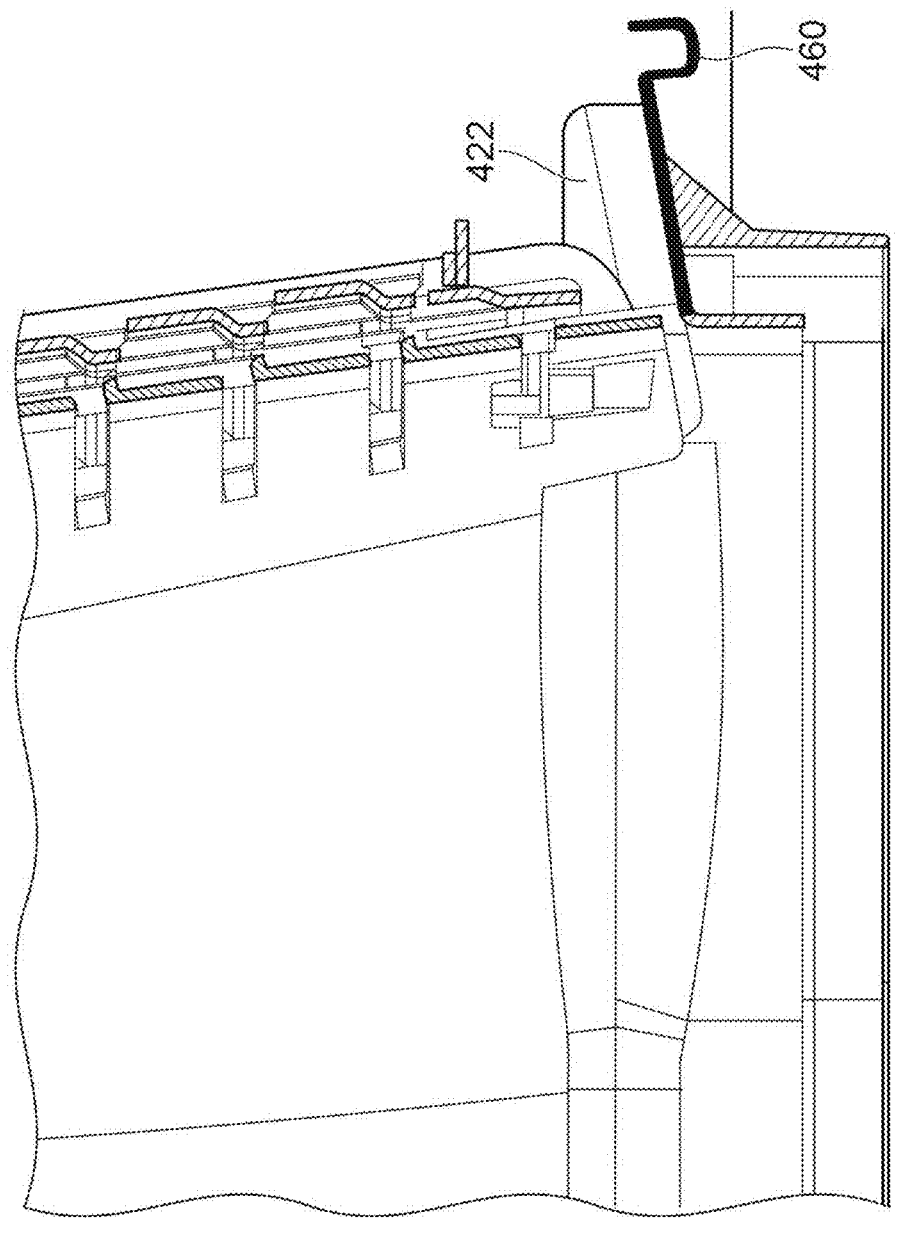
FIG. 7 is a cross-sectional view of the upper container according to a modification.

As illustrated in FIG. 7, the upper container may further have a recessed drainage groove 460 on the outer side of the outer end of the outer extension portion 422. According to such a configuration, urine or the like scattering to the outside beyond the outer extension portion 422 can be received by the drainage groove 460, and it is possible to more appropriately suppress the urine or the like from scattering to the outside of the toilet.

Figure 8:
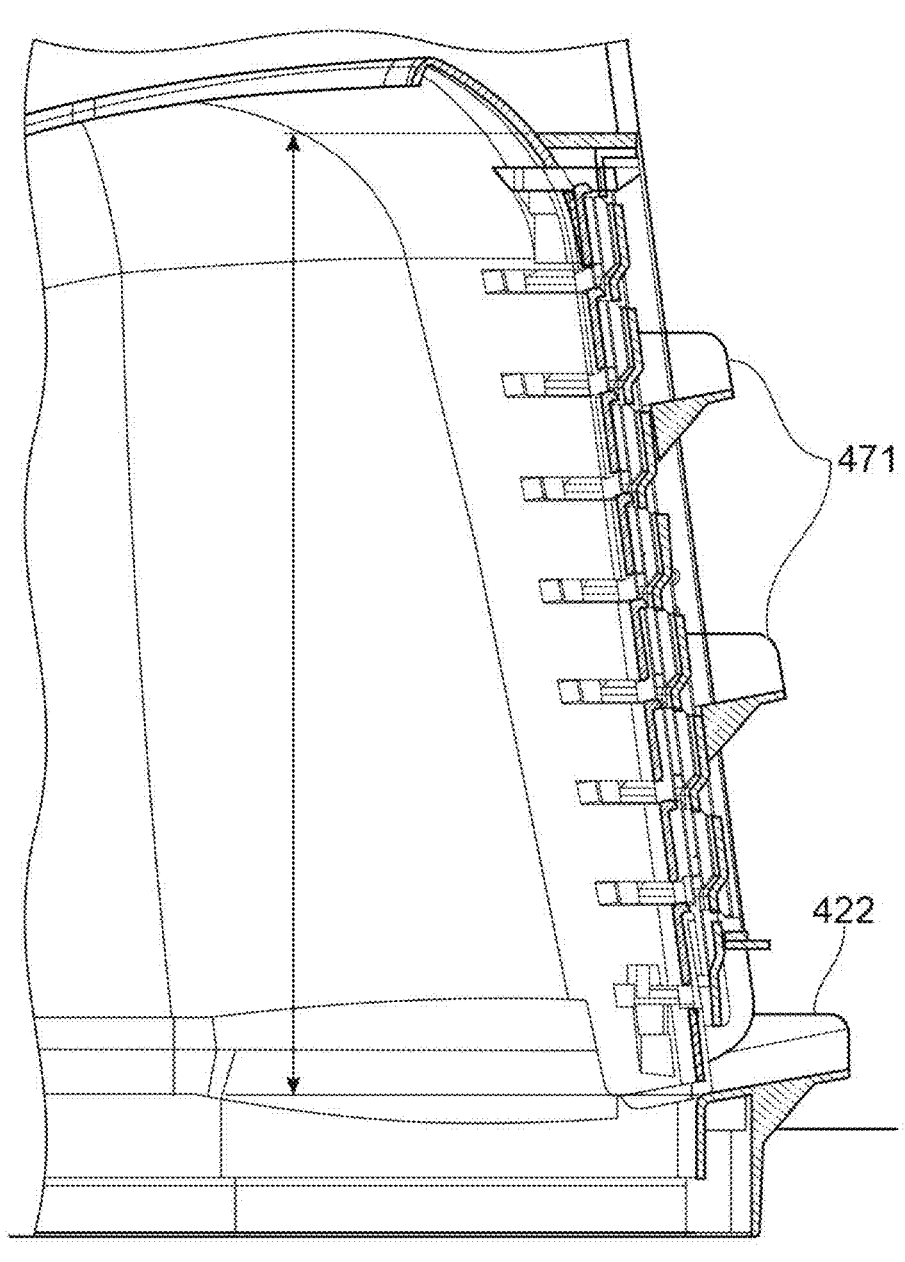
FIG. 8 is a cross-sectional view of the upper container according to a modification.

As illustrated in FIG. 8, the upper container may have a plurality of second extension portions 471 functioning as a urine flow in addition to the outer extension portion 422. In this case, similarly to the outer extension portion 422, each of the second extension portions 471 may be configured to extend outward from the wall portion and may be provided at different heights.

Figure 9:
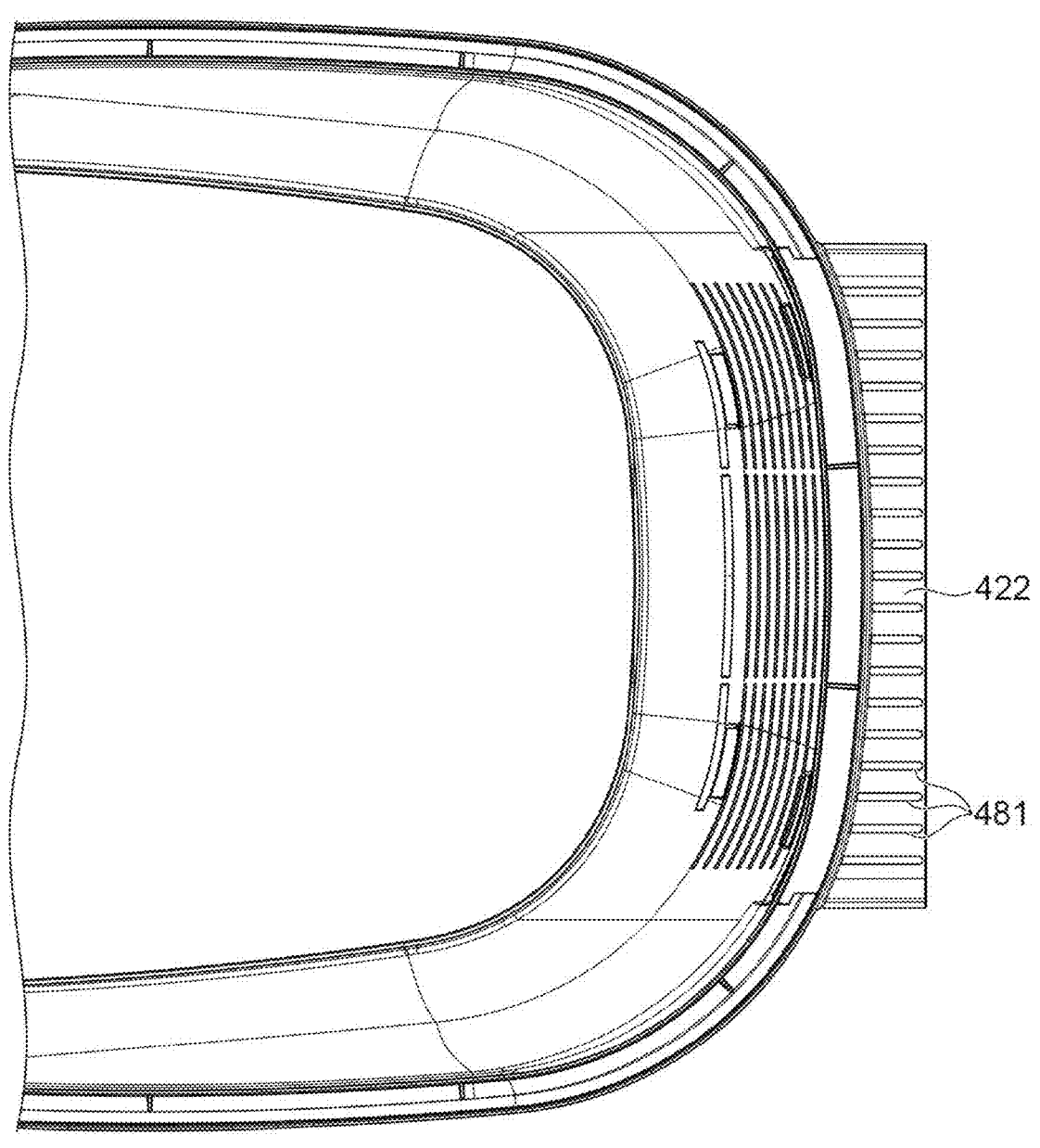
FIG. 9 is a plan view of the upper container according to a modification.

As illustrated in FIG. 9, a plurality of guide grooves 481 may be formed in the outer extension portion 422 along the extending direction. As a result, urine or the like can be appropriately guided to the inside of the toilet, and it is possible to appropriately suppress urine or the like from scattering to the outside of the toilet.

Figure 10:
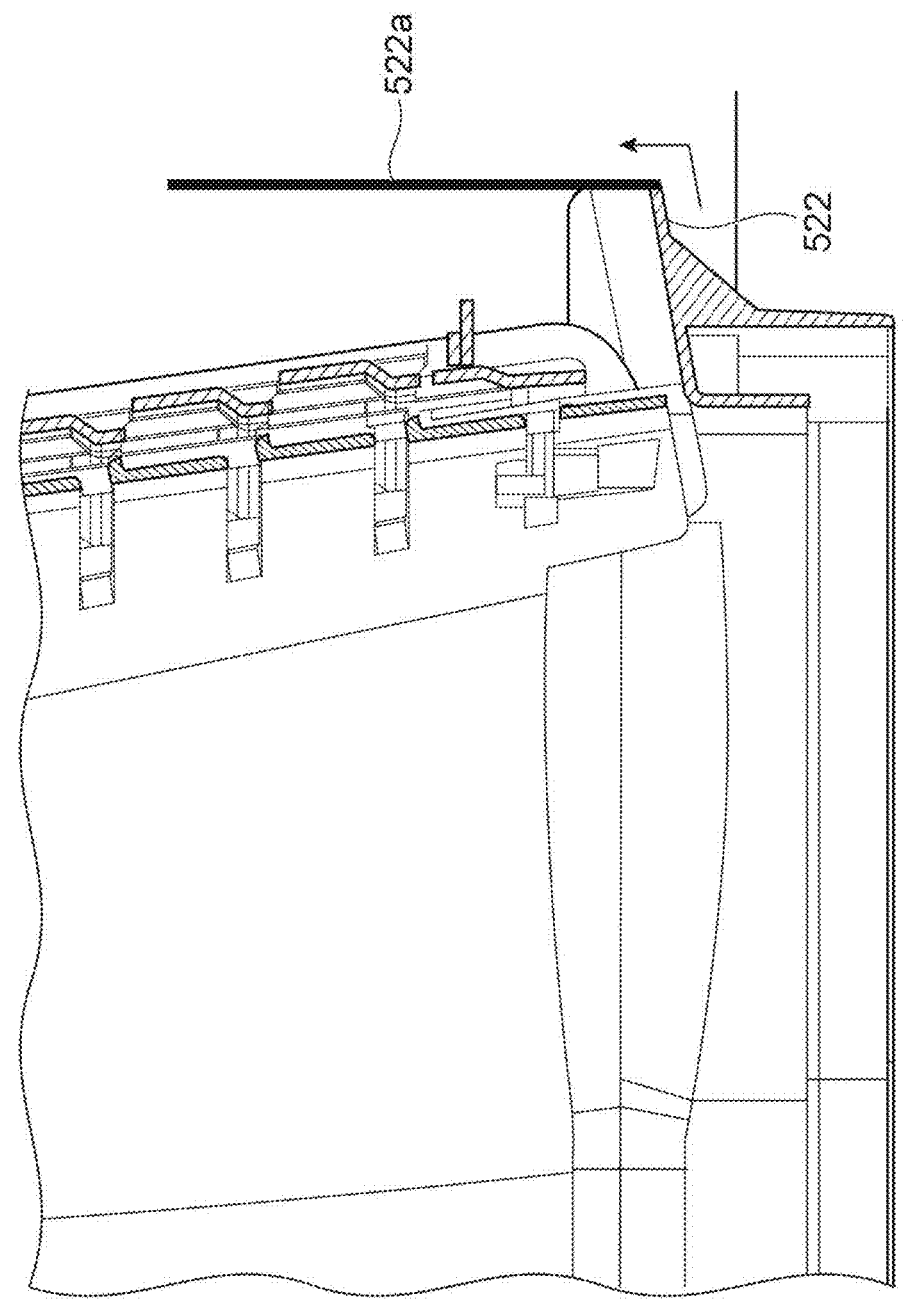
FIG. 10 is a cross-sectional view of the upper container according to a modification.

As illustrated in FIG. 10, the upper container may have an outer extension portion 522 instead of the outer extension portion 422. The outer extension portion 522 has substantially the same configuration as the outer extension portion 422, but has a rear end portion 522a extending upward at its outer end part. By providing such rear end portion 522a in the outer extension portion 522, it is possible to more effectively suppress urine or the like from scattering to the outside of the toilet.

Figure 11:
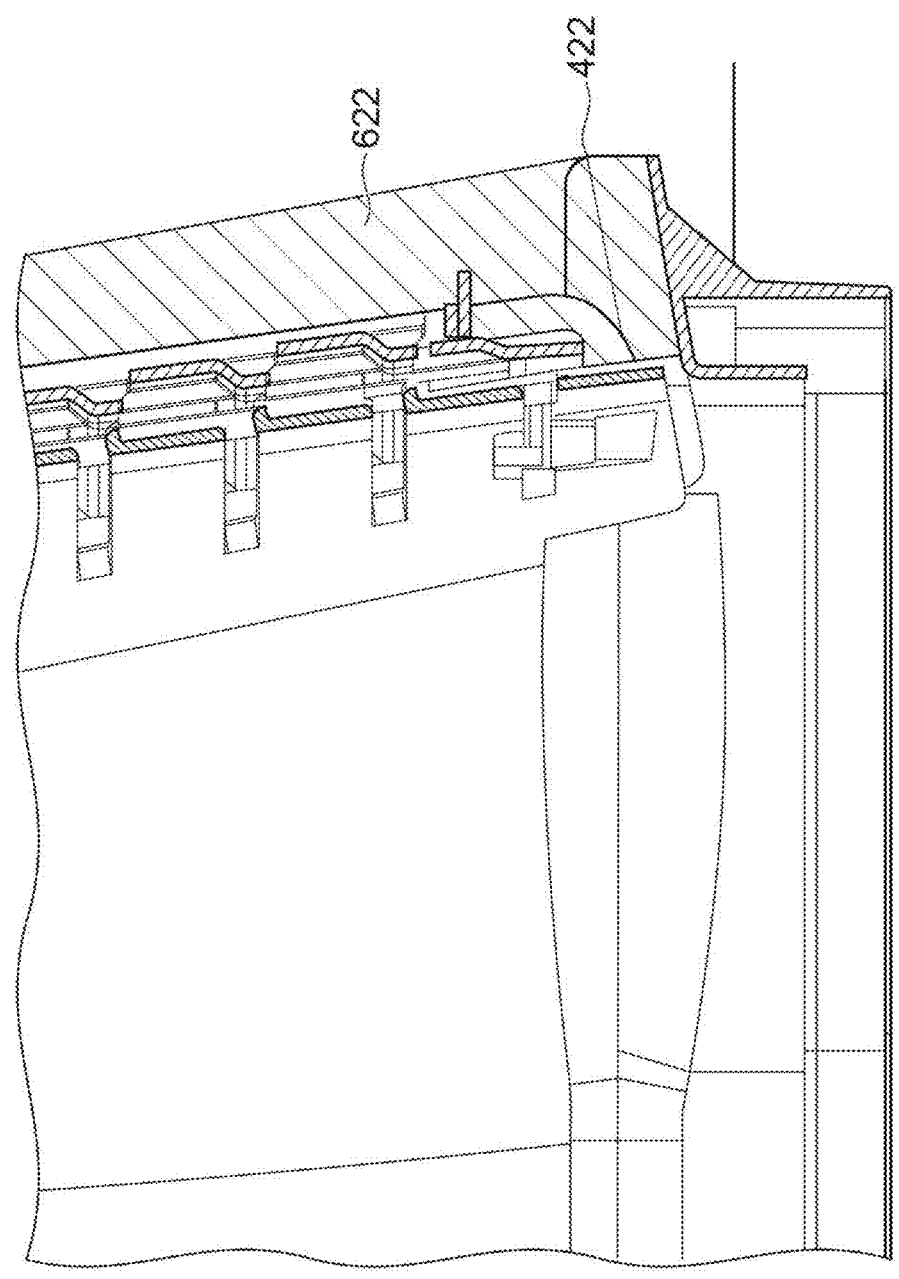
FIG. 11 is a cross-sectional view of the upper container according to a modification.

As illustrated in FIG. 11, the upper container may have lateral walls 622 provided at width-direction both portions of the opening region. By providing such lateral walls 622, it is possible to more effectively suppress urine or the like from scattering to the outside of the toilet.

The opening portion of the opening region may have a vertical length longer than a width-direction length. By making the vertical length of the opening portion sufficiently long, it is possible to improve air permeability in a wide range in the vertical direction, and air can be efficiently moved. For example, odor of urine is lighter than air and tends to stay in an upper portion of a space, while odor of feces is heavier than air and tends to stay in a lower portion of the space. In this regard, by improving air permeability in a wide range in the vertical direction, it is possible to efficiently excrete various offensive odors as described above. This makes it possible to further suppress generation of offensive odor inside the toilet.

Further, a position of a center line of the opening region in the width direction and a position of a center line of the bottom surface portion 21 in the width direction may not coincide with each other. That is, the opening region may be formed at a position shifted from the center of the rear wall portion 42, or may be formed in a wall portion other than the rear wall portion 42. The pet may prefer to evacuate without stress in a state where there is no enter/exit portion in front of the pet. Such a pet excretes at a position shifted from the center line in the width direction of the toilet. In this regard, since the position of the center line of the opening region is shifted from the position of the center line of the toilet (bottom surface portion), it is possible to dispose the opening region in accordance with an excretion position of the pet that excretes at the position shifted from the center line, and dispose the opening region at a position where it is easy to dry feces and urine. This makes it possible to further suppress generation of offensive odor inside the toilet.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Pet toilet system
2 Excretion container
3 Lower container
4, 4A Upper container
5 Tray
21 Bottom surface portion
21a Bottom surface opening
40 Opening portion (enter/exit portion)
41 Front wall portion
42 Rear wall portion
43, 44 Side wall portion
80 External additive member
401 Upper container wall surface
403 Upper container non-ventilation portion
403a First part
403b Second part
421 Opening region
421x Opening portion
421y Upper container wall surface
422 Outer extension portion
425 Engagement portion
450 Inner extension portion
481 Guide groove
801 Cover wall surface
803 Cover non-ventilation portion
803a First cover part
803b Second cover part

What is claimed is:

1. A pet toilet system comprising:
an excretion container, having a liquid-permeable bottom surface portion, that accommodates toilet sand;
a tray, disposed below the excretion container, that accommodates an absorption sheet that absorbs liquid permeated through the liquid-permeable bottom surface portion;
a lower container that holds the tray; and an upper container, disposed above the excretion container, having:
a front wall portion having an enter/exit portion through which a pet enters and exits;
a pair of side wall portions, facing each other in a width direction of the enter/exit portion, extending in a front-rear direction of the upper container; and
a rear wall portion facing the enter/exit portion in the front-rear direction, wherein
the upper container includes an opening region having an opening portion above the liquid-permeable bottom surface portion,
the opening portion has a slit shape,
the upper container further has an outer extension portion, disposed on a wall portion including the opening region, extending outward from the wall portion, and
the outer extension portion is inclined upward toward an outer end part of the outer extension portion.

2. The pet toilet system according to claim 1, wherein
a wall portion of the upper container includes the opening region, and
an area of the opening region is equal to or greater than 5% of an entirety of the liquid-permeable wall portion.

3. The pet toilet system according to claim 1, wherein in the width direction, the opening portion has a length shorter than a length of the bottom surface portion.

4. The pet toilet system according to claim 1, wherein
the liquid-permeable bottom surface portion has bottom surface openings through which the liquid permeates, and
an opening area of the opening portion is smaller than a sum of opening areas of the bottom surface openings.

5. The pet toilet system according to claim 1, wherein in the width direction, a position of a center line of the opening region does not coincide a position of a center line of the liquid-permeable bottom surface portion.

6. The pet toilet system according to claim 1, wherein
the liquid-permeable bottom surface portion has rectangular bottom surface openings through which the liquid permeates, and
the opening portion has a length in a vertical direction of the pet toilet system longer than a length of a short side of each of the rectangular bottom surface openings.

7. The pet toilet system according to claim 1, wherein
the liquid-permeable bottom surface portion has rectangular bottom surface openings through which the liquid permeates, and
the opening portion has a length in a vertical direction of the pet toilet system shorter than a length of a long side of each of the rectangular bottom surface openings.

8. The pet toilet system according to claim 1, wherein the outer extension portion is disposed below a lower end of the opening region.

9. The pet toilet system according to claim 1, wherein
the upper container further has an engagement portion, extending downward from a lower end of the outer extension portion, engaging with the liquid-permeable bottom surface portion, and
the outer extension portion has an outward extension length shorter than a length of the engagement portion in a vertical direction of the pet toilet system.

10. A pet toilet system comprising:
an excretion container, having a liquid-permeable bottom surface portion, that accommodates toilet sand;

a tray, disposed below the excretion container, that accommodates an absorption sheet that absorbs liquid permeated through the liquid-permeable bottom surface portion;

a lower container that holds the tray; and an upper container, disposed above the excretion container, having:

a front wall portion having an enter/exit portion through which a pet enters and exits;

a pair of side wall portions, facing each other in a width direction of the enter/exit portion, extending in a front-rear direction of the upper container; and a rear wall portion facing the enter/exit portion in the front-rear direction, wherein the upper container includes an opening region having an opening portion above the liquid-permeable bottom surface portion, the opening portion has a slit shape, the upper container further has an outer extension portion, disposed on a wall portion including the opening region, extending outward from the wall portion, and the outer extension portion has a guide groove along an extending direction of the outer extension portion.

11. The pet toilet system according to claim 1, wherein the upper container further has an inner extension portion, disposed on the wall portion, extending inward from the wall portion.

12. A pet toilet system comprising:

an excretion container, having a liquid-permeable bottom surface portion, that accommodates toilet sand;

a tray, disposed below the excretion container, that accommodates an absorption sheet that absorbs liquid permeated through the liquid-permeable bottom surface portion;

a lower container that holds the tray; and an upper container, disposed above the excretion container, having:

a front wall portion having an enter/exit portion through which a pet enters and exits;

a pair of side wall portions, facing each other in a width direction of the enter/exit portion, extending in a front-rear direction of the upper container; and a rear wall portion facing the enter/exit portion in the front-rear direction, wherein the upper container includes an opening region having an opening portion above the liquid-permeable bottom surface portion, the opening portion has a slit shape, the pet toilet system further comprises an external additive member, disposed outside the opening region, facing the opening region, and a surface of the external additive member has cover openings at predetermined intervals in a vertical direction of the pet toilet system.

13. The pet toilet system according to claim 12, wherein the external additive member has:

a cover wall surface, disposed below the cover openings, that is continuous with the cover openings in the vertical direction;

a cover non-ventilation portion that extends upward from an upper end of the cover wall surface, covers a part of the cover openings, and has:

a first cover part extending upward and inclining outward; and a second cover part that is continuous with an upper end of the first cover part and extends upward such that an outward inclination angle of the second cover part becomes smaller than an outward inclination angle of the first cover part.

14. The pet toilet system according to claim 12, wherein the upper container further has:

an upper container wall surface, disposed below the opening portion, that is continuous with the opening portion in the vertical direction; and an upper container non-ventilation portion, extending upward from an upper end of the upper container wall surface, that covers a part of the opening portion, and the upper container non-ventilation portion has:

a first part extending upward and inclining outward; and a second part that is continuous with an upper end of the first part and extends upward such that an outward inclination angle of the second part becomes smaller than an outward inclination angle of the first part.

15. The pet toilet system according to claim 1, wherein the upper container further has:

an upper container wall surface, disposed below the opening portion, that is continuous with the opening portion in a vertical direction of the pet toilet system; and an upper container non-ventilation portion, extending upward from an upper end of the upper container wall surface, that covers a part of the opening portion.

16. The pet toilet system according to claim 15, wherein the upper container non-ventilation portion has a first part extending upward and inclining outward.

17. The pet toilet system according to claim 16, wherein the upper container non-ventilation portion further has a second part that is continuous with an upper end of the first part and extends upward such that an outward inclination angle of the second part becomes smaller than an outward inclination angle of the first part.

* * * * *